(12) United States Patent
Umehara et al.

(10) Patent No.: US 7,707,274 B2
(45) Date of Patent: Apr. 27, 2010

(54) OUTPUT REQUESTING APPARATUS, POSITION-MANAGEMENT SERVER, AND COMPUTER PROGRAM PRODUCT

(75) Inventors: Naoki Umehara, Chiba (JP); Takahiro Asai, Kanagawa (JP); Takuya Imai, Tokyo (JP); Yukiko Sahashi, Tokyo (JP); Mototsugu Emori, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 268 days.

(21) Appl. No.: 11/708,950

(22) Filed: Feb. 20, 2007

(65) Prior Publication Data

US 2007/0198102 A1   Aug. 23, 2007

(51) Int. Cl.
*G06F 15/16* (2006.01)
*G06F 15/173* (2006.01)
*G06F 3/12* (2006.01)

(52) U.S. Cl. .................. 709/219; 709/223; 358/1.15

(58) Field of Classification Search .......... 709/220, 709/201, 219, 217, 218, 249, 238, 232, 224, 709/226, 203, 245; 707/501, 505, 506, 530, 707/513; 715/215, 735, 736, 740; 370/230, 370/231, 232, 352, 389, 229, 254, 360; 705/5, 705/6, 1, 28, 26, 27, 56, 35, 37, 44, 10, 14, 705/30, 7; 358/1.1, 1.15
See application file for complete search history.

(56) References Cited

U.S. PATENT DOCUMENTS 5,461,710 A * 10/1995 Bloomfield et al. ......... 715/839
7,327,259 B2 * 2/2008 Kim et al. ................ 340/572.1
2004/0054962 A1 * 3/2004 Shima et al. ............... 715/500
2004/0125145 A1 * 7/2004 Sano et al. .................. 345/771
2004/0179230 A1 * 9/2004 Kitada et al. .............. 358/1.15
2004/0190049 A1 * 9/2004 Itoh ......................... 358/1.15
2005/0128519 A1 * 6/2005 Yamauchi ................. 358/1.15
2005/0144049 A1 * 6/2005 Kuzunuki et al. ............. 705/6

FOREIGN PATENT DOCUMENTS

JP   2001-337765   12/2001

OTHER PUBLICATIONS

Novell, Novell Open Enterprise Server, Aug. 19, 2005, pp. 1-36 and 99-100.*

* cited by examiner

*Primary Examiner*—Nathan Flynn
*Assistant Examiner*—Mark O Afolabi
(74) *Attorney, Agent, or Firm*—Cooper & Dunham LLP

(57) ABSTRACT

A position management server detects positions of a user based on a signal from an RFID tag carried by the user. A PC displays, on a monitor, map information including a layout of the user and a plurality of printers. The user drags and drops a file icon onto a printer icon corresponding to a printer used for printing. The PC transmits a file corresponding to the file icon, printer identification information, and PC identification information to a printer management server. The printer management server selects a driver, generates print data, and transmits the print data to the printer together with the PC identification information. The printer prints the print data and transmits a print notification to the PC. The PC displays the print notification on the monitor.

16 Claims, 15 Drawing Sheets

FIG. 3

| TAG ID | SENSOR ID | DETECTION TIME |
|---|---|---|
| tag 1 | sns 1 | 2004/1/10 15:00:30 |
| tag 2 | sns 2 | 2004/1/10 15:00:28 |
| tag 3 | sns 3 | 2004/1/10 15:00:29 |

FIG. 4

| TAG ID | FLOOR | POSITION INFORMATION | DETECTION TIME |
|---|---|---|---|
| tag 1 | 1F | (12, 14) | 2004/1/10 15:00:30 |
| tag 2 | 2F | (13, 15) | 2004/1/10 15:00:30 |
| tag 3 | 3F | (12, 14) | 2004/1/10 15:00:31 |

FIG. 5A

| PRINTER ID | FLOOR | LOCATION NAME | POSITION INFORMATION (COORDINATES) | ADDRESS (IP ADDRESS, SIP ADDRESS, ETC.) | MODEL | FILE NAME OF ICON | PRINTER ABILITY ID |
|---|---|---|---|---|---|---|---|
| p1 | 1F | MEETING ROOM 1 | (90, 80) | xxx.yyy.yyy.zzz | 40 | p-icon1.gif | CPBLTY 1 |
| p2 | 1F | MEETING ROOM 2 | (110, 80) | nnn.mmm.ooo.nnn | 40a | p-icon2.gif | CPBLTY 2 |
| p3 | 3F | MEETING ROOM 3 | (110, 50) | pri3@abc.co.jp | 40b | p-icon3.gif | CPBLTY 3 |

FIG. 5B

| PRINTER ABILITY ID | PRINT SIZE | COLOR/ MONOCHROME | PAGE LAYOUT | DUPLEX PRINTING | FINISHER |
|---|---|---|---|---|---|
| CPBLTY 1 | A4 B5 | MONOCHROME | ONE PAGE/SHEET | BOTH SIDES (BOUND ON LONG SIDE) | — |
| CPBLTY 2 | A4 A3 B4 B5 | COLOR MONOCHROME | ONE PAGE/SHEET TWO PAGES/SHEET FOUR PAGES/SHEET | BOTH SIDES (BOUND ON LONG SIDE) BOTH SIDES (BOUND ON SHORT SIDE) | STAPLE PUNCH |
| CPBLTY 3 | A4 A3 B4 | COLOR MONOCHROME | ONE PAGE/SHEET TWO PAGES/SHEET | BOTH SIDES (BOUND ON LONG SIDE) | STAPLE |

FIG. 6

| MAP ID | FLOOR | X COORDINATE | Y COORDINATE | FILE NAME OF MAP IMAGE |
|---|---|---|---|---|
| Map 1 | 1F | 0-200 | 0-120 | 1F.jpg |
| Map 2 | 2F | 0-100 | 0-120 | 2F.jpg |
| Map 3 | 3F | 0-200 | 0-120 | 3F.jpg |

FIG. 7

| TAG ID | DESTINATION | TELEPHONE NUMBER | USER NAME | USER ICON NAME | USER PC ADDRESS | IC CARD ID |
|---|---|---|---|---|---|---|
| tag 1 | hum1@xxx.co.jp | 03-xxxx-0001 | OOICHIRO | User1.gif | 111.111.111.111 | ICID 1 |
| tag 2 | hum2@xxx.co.jp | 03-xxxx-0002 | OOJIRO | User2.gif | 222.222.222.222 | ICID 2 |
| tag 3 | hum3@xxx.co.jp | 03-xxxx-0003 | OOSABURO | User3.gif | 333.333.333.333 | ICID 3 |

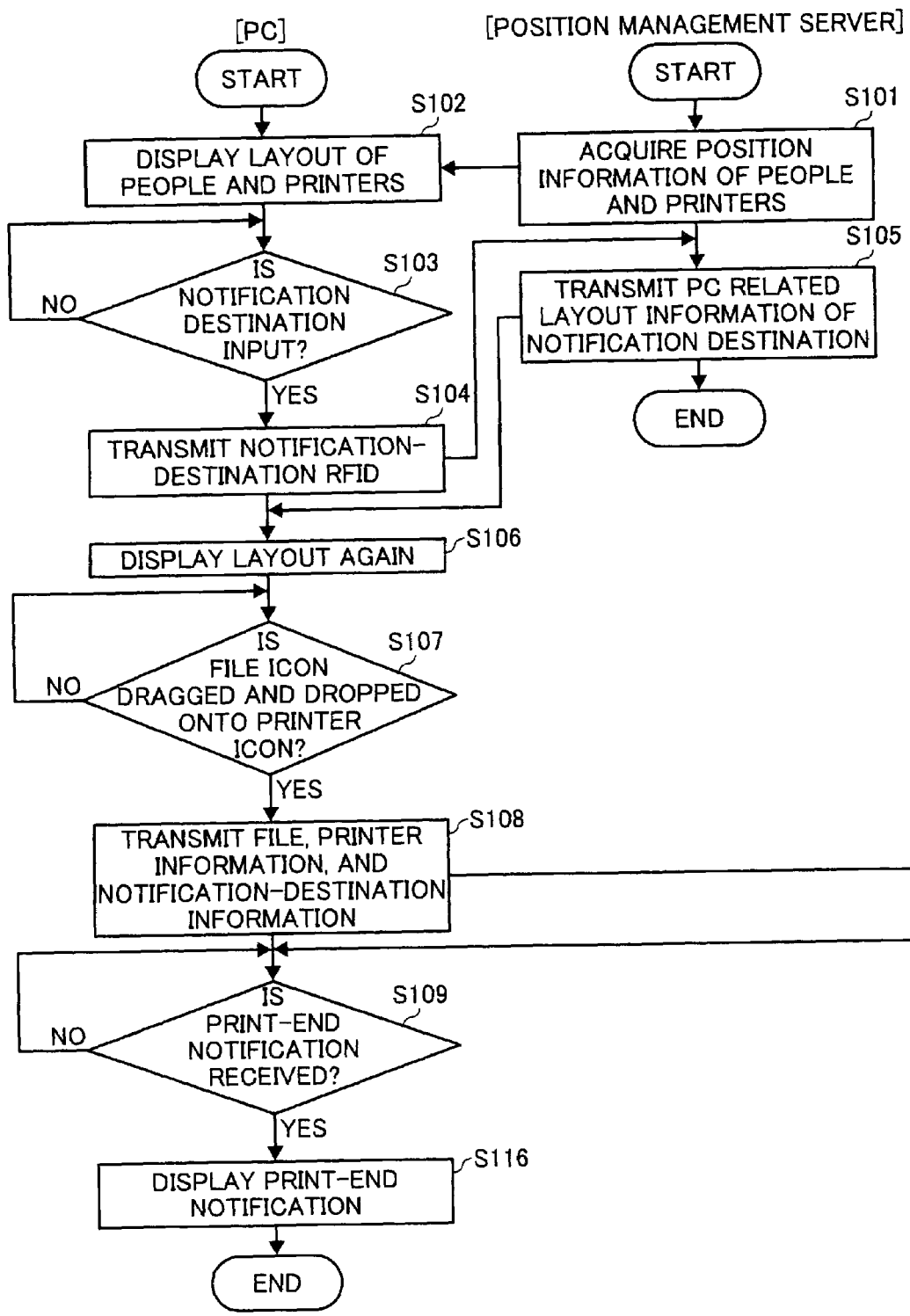

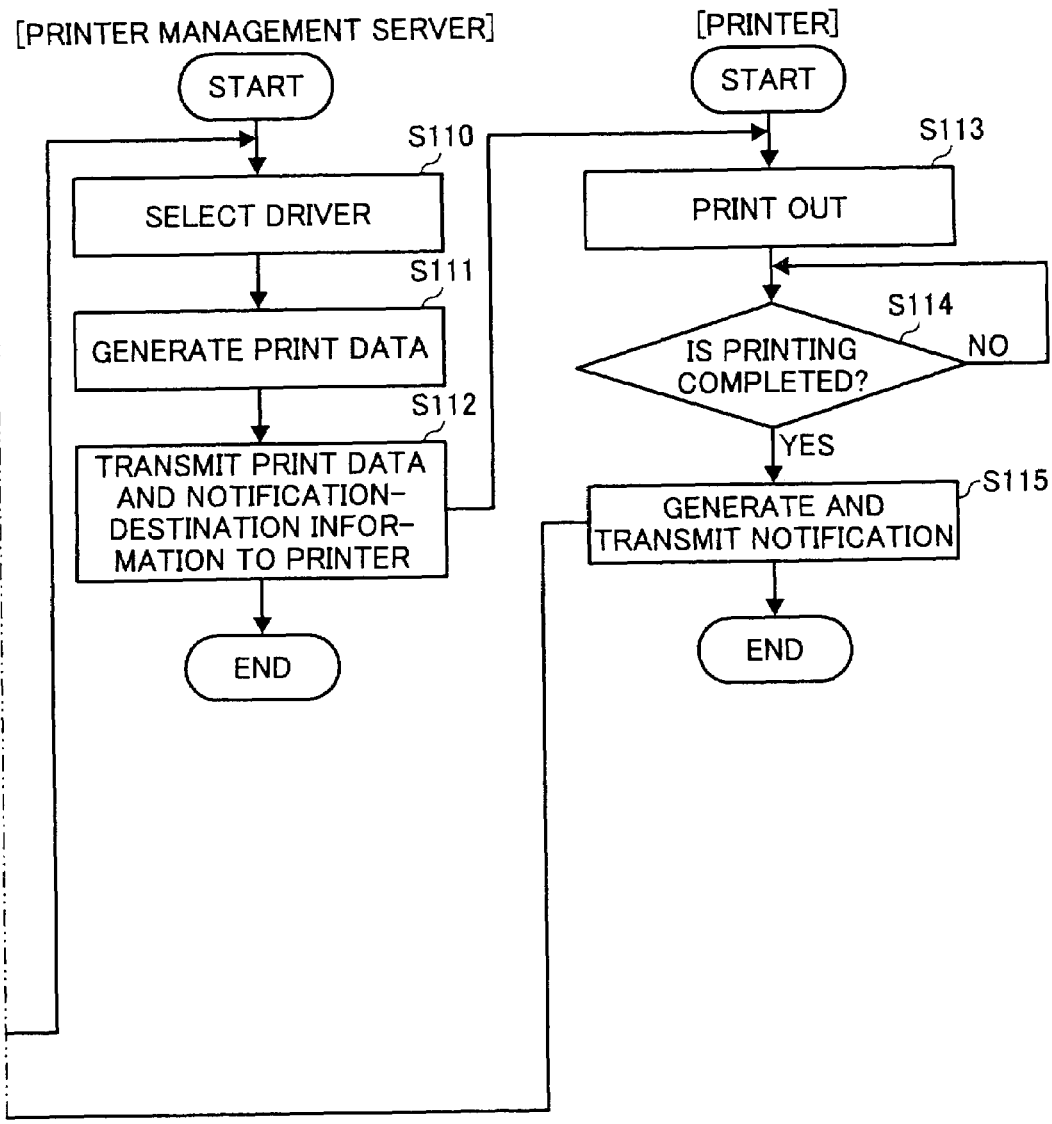

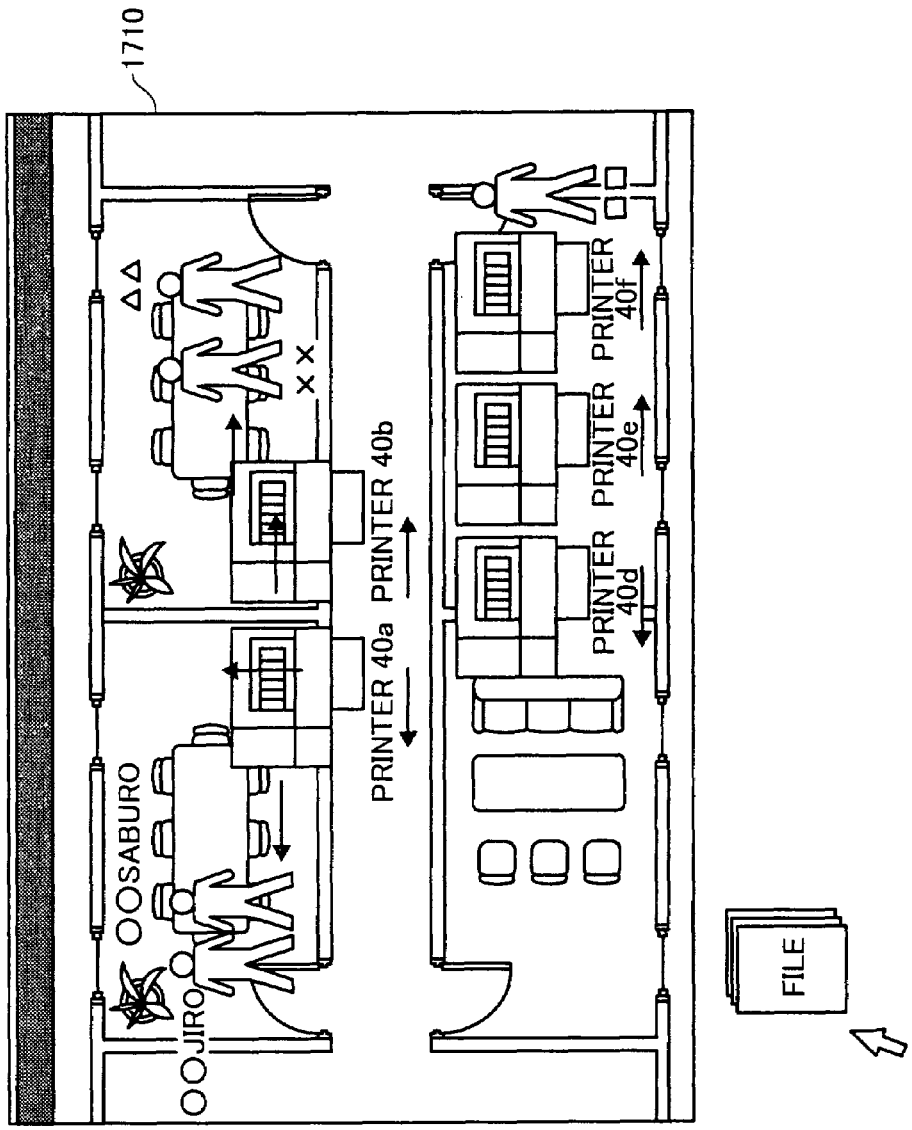

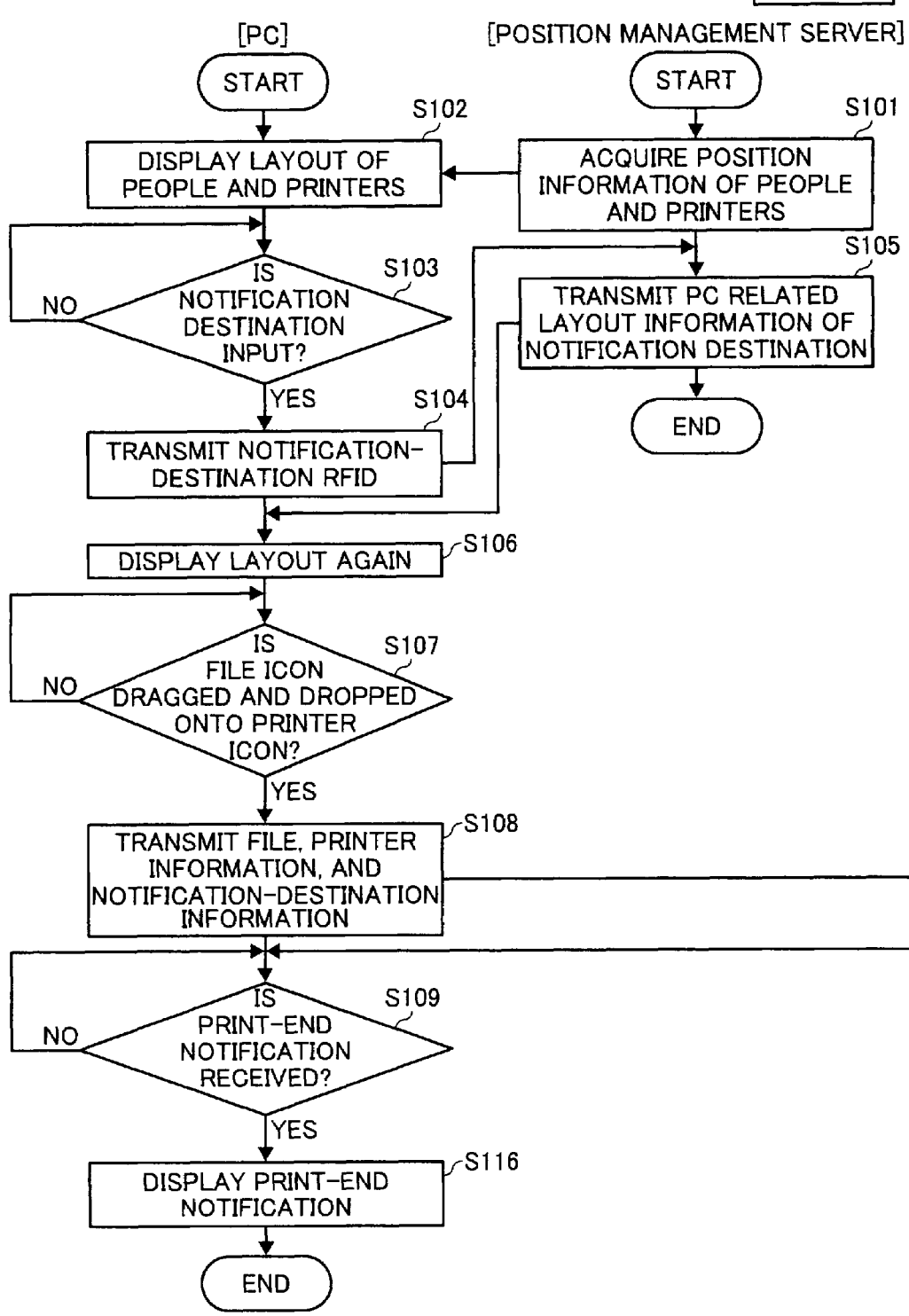

OUTPUT REQUESTING APPARATUS, POSITION-MANAGEMENT SERVER, AND COMPUTER PROGRAM PRODUCT

CROSS-REFERENCE TO RELATED APPLICATIONS

The present document incorporates by reference the entire contents of Japanese priority document, 2006-043148 filed in Japan on Feb. 20, 2006 and Japanese priority document, 2007-006316 filed in Japan on Jan. 15, 2007.

BACKGROUND

1. Technical Field

This disclosure relates to an output requesting apparatus, a position-management server, and a computer program product for requesting output of data.

2. Description of the Related Art

In recent years, a large number of printing apparatuses such as printers are installed in offices. The printing apparatuses are connected to a network, and accessible from various places. To use these printing apparatuses through the network, drag-and-drop operation is often used for initial setting of the printing apparatuses, printing, and the like. For example, printing is started when a file is dragged and dropped onto a printer icon.

In a print-control operation system disclosed in Japanese Patent Application Laid-Open No. 2001-337765, a print icon in which print conditions are set in advance and a file icon of a file to be printed are displayed on a display screen. When the file icon is dragged and dropped on the print icon on the display screen, setting of a printer indicated by the print icon is displayed. Printing of the file is performed under the print conditions set in the print icon. This enables a user to instruct printing and check print settings by an intuitive operation of dragging and dropping a file.

However, in the conventional technology, the user can find a position of a printer set by drag-and-drop operation relying only on the memory about installation of the printer. When there are printers of similar models, it is difficult to distinguish the printers. Besides, the user cannot grasp a position of a user personal computer (PC), positions of PCs of others, and positions of printers. When the user outputs a file from a printer that is not usually used, a new printer driver needs to be set. Therefore, complicated work is inevitable.

In the conventional technology, when a file is dragged and dropped onto the printer icon, it is difficult to determine a position of a printer to which the icon corresponds. It is also unclear whether a printer by which the user intends to print a file using the PC is a printer in a position optimum for the user. In this case, in particular, when the user outputs a document file from a printer near another person as easily as transmitting a facsimile to the person, a positional relation among the printers is unclear, and it is difficult to properly select a printer. Even if a printer is selected, setting work for the printer is necessary.

BRIEF SUMMARY

According to an aspect of this disclosure, an output requesting apparatus that is connected via a network to an output apparatus and a position-management server that manages user-position information indicating a position of a user and apparatus-position information indicating a position of the output apparatus, includes a storage unit that stores therein data, a receiving unit that receives, from the position-management server, the user-position information, the apparatus-position information, and a map image that indicates an area where the output apparatus is installable, a display control unit that arranges a user symbol indicating the user, an apparatus symbol indicating the output apparatus, and a data symbol indicating the data in the map image based on the user-position information and the apparatus-position information, and displays the map image on a display unit, an input unit, that receives input to select the apparatus symbol and the data symbol in the map image, and a transmitting unit that transmits, to the Output apparatus corresponding to the apparatus symbol, a first command to request the output apparatus to output the data corresponding to the data symbol, and a second command to request the output apparatus to notify the output requesting apparatus of output state.

According to another aspect of this disclosure, a position-management server that is connected via a network to an output apparatus and an output requesting apparatus, includes a position acquiring unit that acquires user-position information indicating a position of a user, a storage unit that stores therein apparatus-position information indicating a position of the output apparatus, and a map image that indicates an area where the output apparatus is installable, and a transmitting unit that transmits the user-position information, the apparatus-position information, and the map image to the output requesting apparatus.

According to still another aspect of this disclosure, a computer program product comprises a computer usable medium having computer readable program codes embodied in the medium that when executed, cause a computer to implement the above method.

The above and other aspects, features, advantages and technical and industrial significance of this disclosure will be better understood by reading the following detailed description of presently preferred embodiments of the invention, when considered in connection with the accompanying drawings.

BRIEF DESCRIPTION OF THE DRAWINGS

FIG. 3 is an example of contents of a tag-signal management table shown in FIG. 2;

FIG. 4 is an example of contents of a tag-ID-position management table shown in FIG. 2;

FIG. 5A is an example of contents of a printer-information management table shown in FIG. 2;

FIG. 5B is an example of contents of a printer-ability management table shown in FIG. 2;

FIG. 6 is an example of contents of a map-information management table shown in FIG. 2;

FIG. 7 is an example of contents of a user-information management table shown in FIG. 2;

FIGS. 9A and 9B collectively show a flowchart of a printing process according to the first embodiment;

FIGS. 10A and 10B collectively show a schematic for explaining a laid-out map image displayed on a monitor by a printing system according to a second embodiment of the present invention;

FIGS. 12A and 12B collectively show a flowchart of a printing process according to the third embodiment.

DETAILED DESCRIPTION OF THE PREFERRED EMBODIMENTS

Exemplary embodiments of the present invention are explained in detail below with reference to the accompanying drawings. In the embodiments explained below, a printing system is explained as an example in which data is printed by a printer as an output apparatus in response to a request from a personal computer (PC) as an output requesting apparatus via a printer management server as an output-management server.

In a printing system according to a first embodiment of the present invention, a position management server detects a position of a user according to a detection signal from a radio frequency identification (RFID) tag (a radio tag) carried by the user. The position management server transmits map information including position information of the user and position information of a plurality of printers to a personal computer (PC). The PC displays, on a monitor screen, a map image in which a user icon and printer icons are laid out. The user selects desired data (file) on the monitor by dragging and dropping a file icon onto an icon of a printer by which the user intends to print the file. Then, the PC transmits the file selected and printer information to a printer management server. The printer management server selects a driver according to the printer information received and generates print data of the file. The printer management server transmits the print data to the printer together with notification-destination information. The printer prints the print data received and transmits information on print notification to the user PC at the notification destination. The PC receives the print notification and displays the print notification on the monitor.

In this manner, in the printing system according to the first embodiment, the user displays a map image indicating a present position of the user or another user and layout of printers on the monitor of the PC, so that the user can visually checks a positional relation among the printers. The user drags and drops an icon corresponding to data that he/she wishes to print onto a printer icon of a printer to cause the printer to print the data. The PC displays printing state of the printer on the monitor of the PC. Consequently, the user can select, without complicated printer setting on the PC, a printer and print out desired data by the printer with simple operation and cause the PC of the user to indicate the printing state. This makes it possible to print out the data with simple operation, reduce complexity of data management, and perform highly convenient printing.

Figure 1:
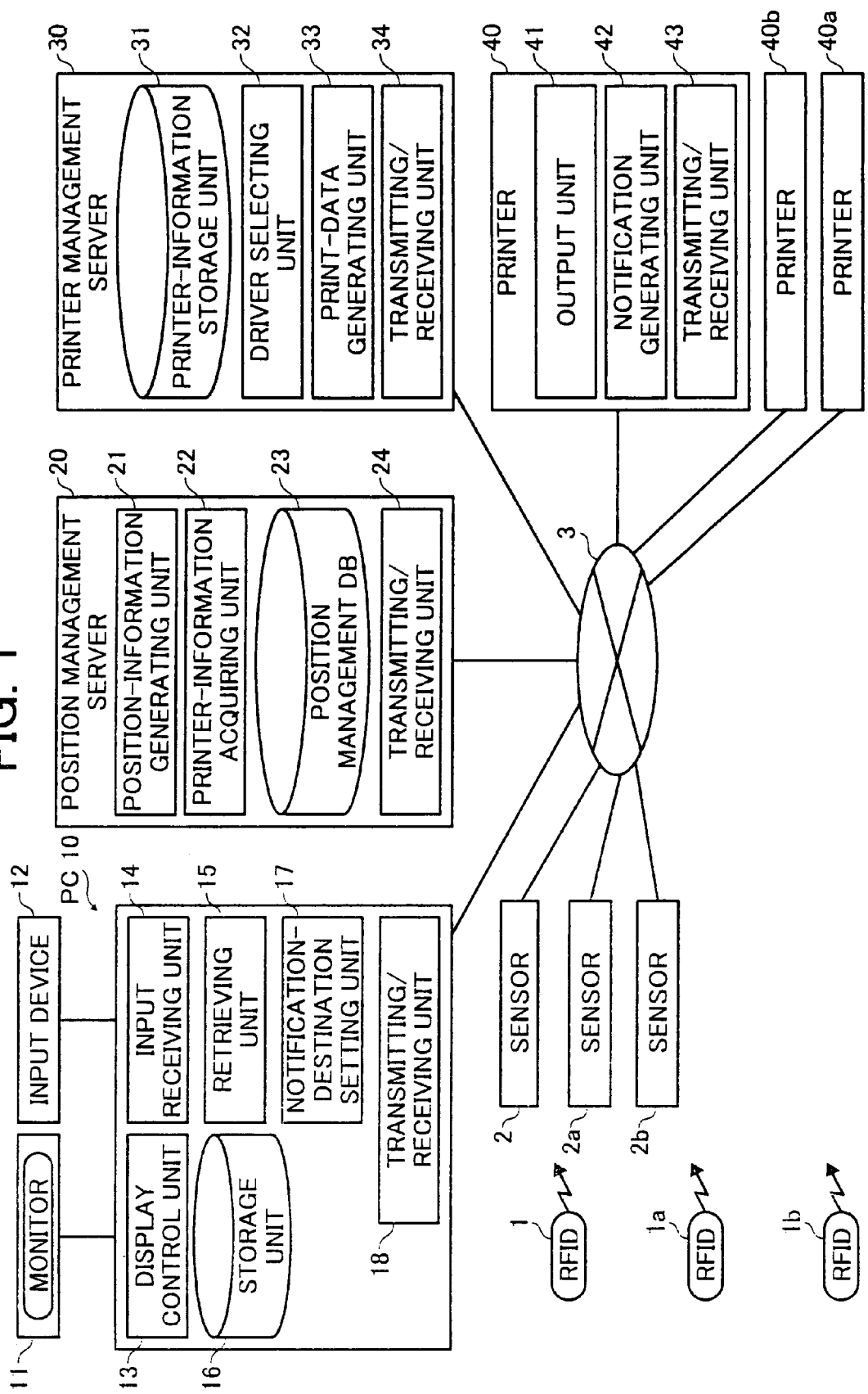
FIG. 1 is a functional block diagram of a printing system according to a first embodiment of the present invention.

FIG. 1 is a functional block diagram of the printing system according to the first embodiment. The printing system includes a personal computer (PC) 10, a position management server 20, a printer management server 30, printers 40, 40a, and 40b, and sensors 2, 2a, and 2b, which are connected to one another via a network 3. Each of users entering an area in which the printing system is set carries an RFID tag (hereinafter, "RFID"). It is assumed herein that there are three users 1, 1a, and 1b who carry RFIDs 1, 1a, and 1b, respectively.

In FIG. 1, the three printers, the three sensors, and the three RFIDs are shown. However, the number can be arbitrary changed.

The network 3 can be a telephone line, a radio network, or the Internet. The RFID 1 is an active radio tag that transmits an identification signal by a radio wave every one second. However, the RFID 1 is not limited to the active radio tag and can be a passive RFID. The RFID is used for detecting a position of a carrier thereof. Therefore, it is also possible to perform communication according to the Wi-Fi (wireless LAN) standard, the Bluetooth standard, or the ZigBee standard for actively emitting a radio wave using, for example, a cellular phone, a PC, a personal digital assistant (PDA), a wireless LAN tag, or an IC card.

In the area in which the printing system is set, the users carry the RFIDs 1 to 1b, respectively. The sensors 2 to 2b receive identification signals transmitted from the RFIDs 1 to 1b.

It is assumed that the user 1 who carries the RFID 1 operates the PC 10. In this explanation, an RFID is carried by a user. However, other than the human user, it is also possible to set the RFID in an object such as the printer 40 or the PC 10. In this case, for example, when the printer 40 or the PC 10 is a portable apparatus, even if the user moves carrying the apparatus, position information of the moving apparatus is acquired and a state of the moving apparatus is displayed on the monitor of the PC every moment. However, for simplification of the explanation, it is assumed that the PC and the printer are fixedly set. The RFID is a radio tag for detecting a position, and is sometimes simply referred to as "tag" below as appropriate.

The sensors 2, 2a, and 2b are set in the area to which this system is applied and receive identification signals from the RFIDs 1, 1a, and 1b. The sensors 2, 2a, and 2b transmit the identification signals received to an address and a port indicating the position management server 20 through the network 3.

The position management server 20 includes a position-information generating unit 21, a printer-information acquiring unit 22, a position management database 23, and a transmitting/receiving unit 24. The transmitting/receiving unit 24 receives the identification signals for the RFIDs transmitted from the sensors 2 to 2b. The position-information generating unit 21 generates position information of the RFIDs based on the identification signals received. The position management database 23 stores therein information on printers, sensors, RFIDs, maps, and users as described later. The position management database 23 is stored in a storage medium such as a hard disk (HD) or a memory. The transmitting/receiving unit 24 transmits the position information of the RFIDs generated, position information of the printers 40, 40a, and 40b acquired from the position management database 23, and map information to the PC 10. The position information of the printers and the position information of the PC set in the area are included in the map information.

In the following explanation, the RFIDs may be represented by the RFID 1, the sensors may be represented by the sensor 2, and the printers may be represented by the printer 40. Main sections of the RFIDs, the sensors, the PCs, and the printers have identical structures, respectively.

The position-information generating unit 21 associates a sensor ID of the sensor 2 that detects the RFID 1 and position information of a position in which the sensor 2 is set. It is possible to specify this sensor ID from a correspondence relation between the sensor ID and an address of the sensor 2. It is possible to specify the address of the sensor 2 at a transmission source, which transmits a detection signal, according to a transmission source address included in a header of a packet used in transmitting the information.

The position-information generating unit 21 acquires the position information of the RFID. Since the RFID is carried by the user who operates the PC, the position-information generating unit 21 generates position information of the user.

Figure 2:
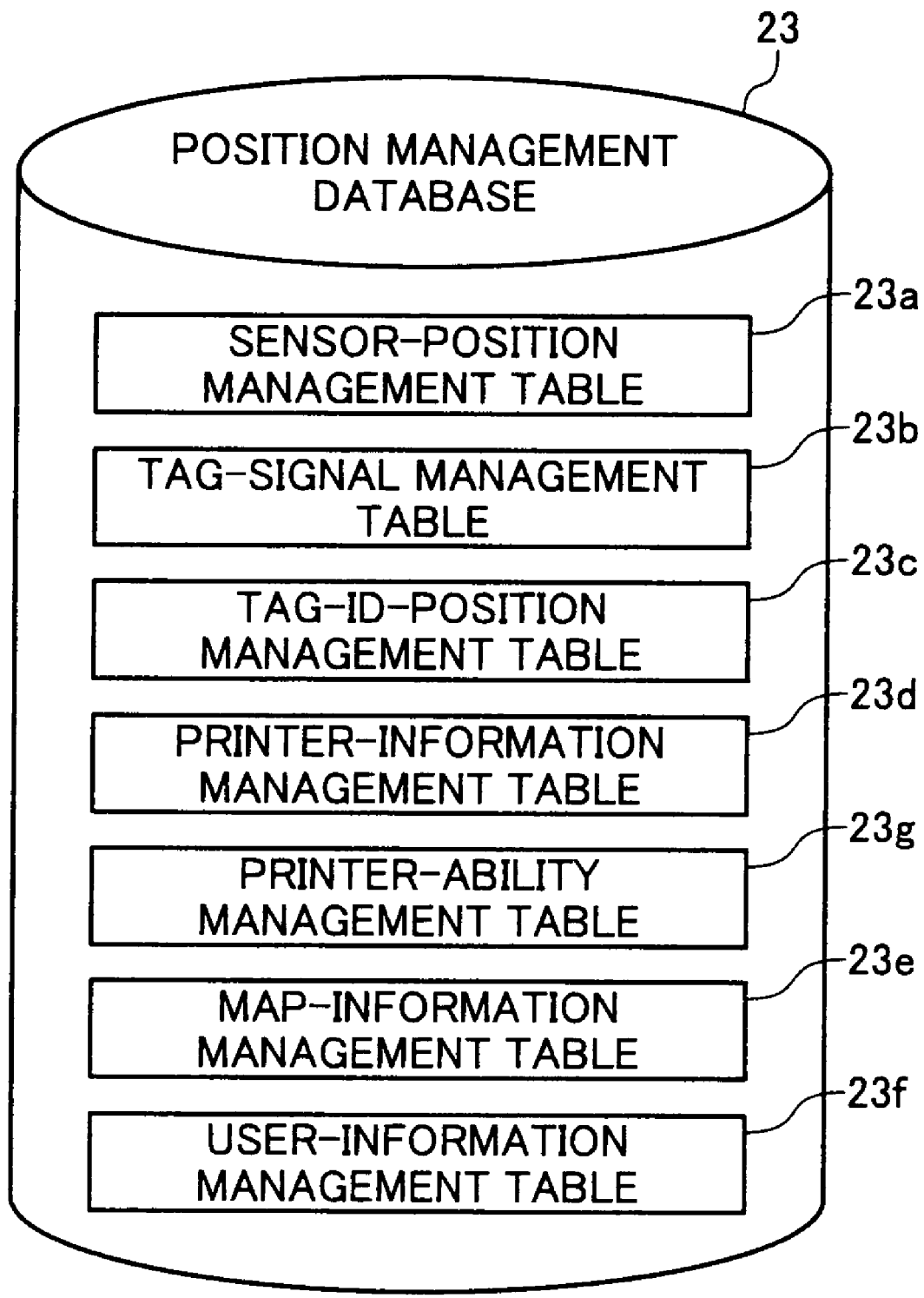
FIG. 2 is a functional block diagram of a position management database shown in FIG. 1.

FIG. 2 is a functional block diagram of the position management database 23. The position management database 23 includes a sensor-position management table 23a, a tag-signal management table 23b, a tag-ID-position management table 23c, a printer-information management table 23d, a printer-ability management table 23g, a map-information management table 23e, and a user-information management table 23f.

The sensor-position management table 23a contains information such as sensor ID, sensor position information, sensor address, and floor on which each sensor is set in association with one another. The sensor address is IP address for specifying the sensor. It is possible to specify sensor position by associating the sensor ID and the sensor address.

FIG. 3 is an example of contents of the tag-signal management table 23b. As shown in FIG. 3, the tag-signal management table 23b contains information such as tag ID, sensor ID, detection time in association with one another. This makes it possible to associate a tag, a sensor that detects the tag, and detection time. It is seen from data in FIG. 3 that the RFID 1 is presently near a sensor sns1.

FIG. 4 is an example of contents of the tag-ID-position management table 23c. As shown in FIG. 4, the tag-ID-position management table 23c contains information such as tag ID, floor, position information, and detection time in association with one another. Respective records in the tag-ID-position management table 23c are generated based on records in the sensor-position management table 23a and the tag-signal management table 23b. Position information and time information of detection of a tag is obtained by the tag-ID-position management table 23c.

In receiving tag detection signals from the sensors 2 to 2b, the transmitting/receiving unit 24 can specify IP addresses of the sensors by referring to headers of packets. The tag IDs, the detection signals, and the IP addresses of sensors are information decided to be transmitted from the sensors 2 to 2b. The transmitting/receiving unit 24 requests the position-information generating unit 21 to update the position management database 23 with information obtained by associating the detection time with the information received. The detection time is time when the sensors 2 to 2b detect the RFIDs 1 to 1b, i.e., present time when identification signals from the RFIDs are received from the sensors 2 to 2b.

The position-information generating unit 21 specifies sensor IDs according to the IP addresses of the sensors input from the transmitting/receiving unit 24 with reference to the sensor-position management table 23a. The position-information generating unit 21 associates the sensor IDs specified, the tag IDs input, and the detection time to update the records of the tag-signal management table 23b, the tag IDs and the sensor IDs of which coincide with the sensor IDs specified and the tag IDs input. Consequently, latest information is held for the tag IDs in the tag-signal management table 23b.

The position-information generating unit 21 acquires, every period decided in advance, the sensor ID and the detection time associated with the tag IDs held by the tag-signal management table 23b and the floors and the position information associated with the sensor IDs. The position-information generating unit 21 calculates position information associated with the tag IDs based on the information acquired and acquires position information of the RFIDs 1 to 1b.

The position management database 23 stores therein printer information of the printers 40, 40a, and 40b including icon image information, printer IDs as unique identification information, position information indicating actual arrangement positions, IP addresses and SIP addresses, models, and other image-related information such as display methods in association with one another.

FIG. 5A is an example of contents of the printer-information management table 23d. As shown in FIG. 5A, the printer-information management table 23d contains information such as printer ID, floor on which each printer is set, location name, position coordinates, address, model, file name of an icon as a symbol, and printer ability ID of each printer in the system in association with one another. The information on the printers registered in the printer-information management table 23d can be obtained by accumulating information input previously or downloaded via the network 3. The printer ability IDs are IDs for identifying print functions of the printers indicated by the printer IDs. The print functions corresponding to the printer ability IDs are registered in the printer-ability management table 23g.

FIG. 5B is an example of contents of the printer-ability management table 23g. In the printer-ability management table 23g, as shown in FIG. 5B, available print size, color/monochrome indicating whether the printer is capable of color printing or only monochrome printing, printable page layout, type of duplex printing, and finisher indicating whether stapling is possible, punching is possible, or both the stapling and the punching are impossible are associated with the printer ability ID as print functions.

In this embodiment, as described above, the printer-ability management table 23g in which the ability information as the print functions of the printers are classified for each of the printer ability IDs is provided. The printer ability IDs are associated with the printer IDs in the printer-information management table 23d to define the ability information for each of the printers. A way of deciding the ability information is not limited to this. For example, in the printer-information management table 23d, the ability information such as print size, color/monochrome, page layout, duplex printing, and finisher can be directly associated with the printer ID to define the ability information for each printer.

FIG. 6 is an example of contents of the map-information management table 23e. As shown in FIG. 6, the map-information management table 23e contains information such as map ID, floor indicated by the map, X coordinate and Y coordinate indicating a range to be displayed, and file name of each map image in association with one another.

FIG. 7 is an example of contents of the user-information management table 23f. As shown in FIG. 7, the user-information management table 23f contains information such as tag ID carried by each user, destination to which notification is to be sent, telephone number of the user, user name, name of an icon indicating the user, user PC address, and IC card ID carried by the user in association with one another. As described later, the IC card is used for authentication in acquiring a print. The user PC address is an address of a PC operated by the user.

The position-information generating unit 21 acquires position information of tags, detection time information, and file names of icons indicating owners of RFIDs from the position management database 23 with reference to the user-information management table 23f.

The printer-information acquiring unit 22 acquires the printer IDs, the floors on which printers are set, the location names, the position coordinates, the addresses, the printer types, and file names of icons of the printers 40, 40a, and 40b from the position-management database 23 with reference to the printer-information management table 23d.

The printer-information acquiring unit 22 acquires map information in which printers and users should be displayed as icons based on the positions of the RFIDs detected and the printer IDs with reference to the map-information management table 23e. As these kinds of information, information corresponding to the position information of the RFIDs is acquired based on the position information.

The transmitting/receiving unit 24 transmits the position information of the RFIDs acquired, the IDs of the users as the owners of the RFIDs, the icons indicating the users, the printer information (the information registered in the printer-information management table 23d in FIG. 5A), the printer ability information corresponding to the printer ability IDs (the information registered in the printer-ability management table 23g in FIG. 5B), the icons indicating the printers, and the map images to the PC 10.

The PC 10 includes a monitor 11, an input device 12, a display control unit 13, an input receiving unit 14, a retrieving unit 15, a storage unit 16, a notification-destination setting unit 17, and a transmitting/receiving unit 18. In the following explanation, to pass a print of a file stored in the PC 10 of the user 1 to the user 1b on another floor, the user 1 operates the PC 10 to output the print in a printer near the user 1b and notifies the user 1b of printing of the file. Although data to be printed is explained as a fail, the data need not necessarily be in a file form.

The monitor 11 is a display device that displays characters and images.

The display control unit 13 receives the positions and the icons of the RFIDs 1 to 1b, the positions and the icons of the printers 40 to 40b, the ability information of the printers, and the map information transmitted from the position management server 20. The display control unit 13 causes the monitor 11 to display the location of the users and the printers on a screen of the monitor 11 as icons as symbols. A browser or dedicated software is used for the display on the screen of the monitor 11.

The display control unit 13 also causes the monitor 11 to display icons and the like of data stored in the storage unit 16 on the screen of the monitor 11. Further, the display control unit 13 causes the monitor 11 to display text information such as "Ichiro" and "beside the entrance of 8F" on the display screen of the monitor 11 that indicates the name of a user and the location of a printer as actual position information of the printer by letters or characters.

The icons are various data and processing functions displayed on the display screen of the monitor 11 as pictures or pictographs. In this embodiment, the icons of the printers and the users are displayed on the display screen of the monitor 11 as indication of the printers and the users. However, the indication of the printers and the users are not limited to the icons. A symbol including an icon and various data and processing functions indicated by a sign, a character string, and the like can be displayed.

The input device 12 is a pointing device such as a mouse, a trackball, or a track pad, a keyboard, or the like. A user performs operation by drag-and-drop and operation on the screen displayed on the monitor 11 using the input device 12. The drag-and-drop is a method of operating the mouse or the like and is operation for continuously performing drag and drop. The term "drag" means operation for moving a pointer while button of the mouse or the like is kept pressed and "drop" means operation for releasing the button of the mouse or the like at a moving destination of the drag.

The input receiving unit 14 receives the drag and drop operated from the input device 12. The input receiving unit 14 also receives other inputs from the input device 12.

Figure 8A:
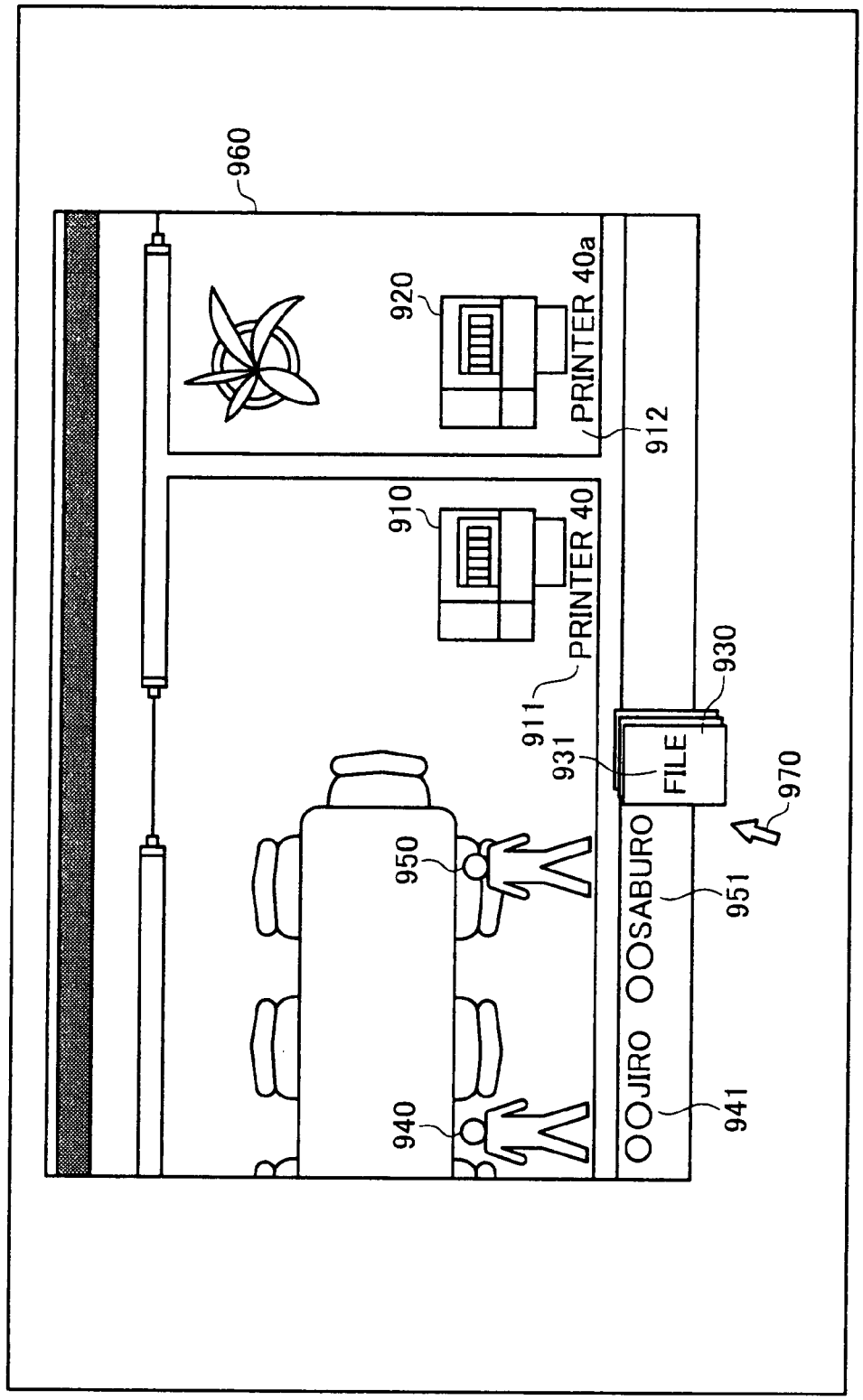
FIG. 8A is an example of a map image that depicts a people, PCs, and printers laid out therein displayed on a display screen of a monitor shown in FIG. 1.

FIG. 8A is an example of a map image that depicts people, PCs, and printers laid out therein displayed on the display screen of the monitor 11. As shown in FIG. 8A, a layout image 960 of an office is displayed on the display screen of the monitor 11 according to information transmitted from the position management server 20. In the layout image 960 of the office displayed on the monitor 11, icons 910 and 920 and text information 911 and 912 of the printers 40 and 40a, an icon 930 and text information 931 of a file, and icons 940 and 950 and text information 941 and 951 of people are arranged in relative positions. This floor is the third floor. A pointer 970 for performing operation using the input device 12 is displayed in a form of an arrow on the monitor 11.

In FIG. 8A, Saburo is the user 1b who carries the RFID 1b and operates a PC on the third floor. Ichiro (not shown) is the user 1 who carries the RFID 1 and operates the PC from the first floor.

When a user moves the pointer 970 of the mouse onto the icons 910 and 920 of the printers 40 and 40a and points the icons 910 and 920, the input receiving unit 14 receives pointed inputs of the icons 910 and 920. The display control unit 13 extracts ability information corresponding to the printers 40 and 40a of the icons 910 and 920 pointed from ability information (print functions) received and displays the ability information extracted to be superimposed on the layout image 960. This allows the user to select an appropriate printer and print the file after grasping the print functions of the printers 40 and 40a.

Figure 8B:
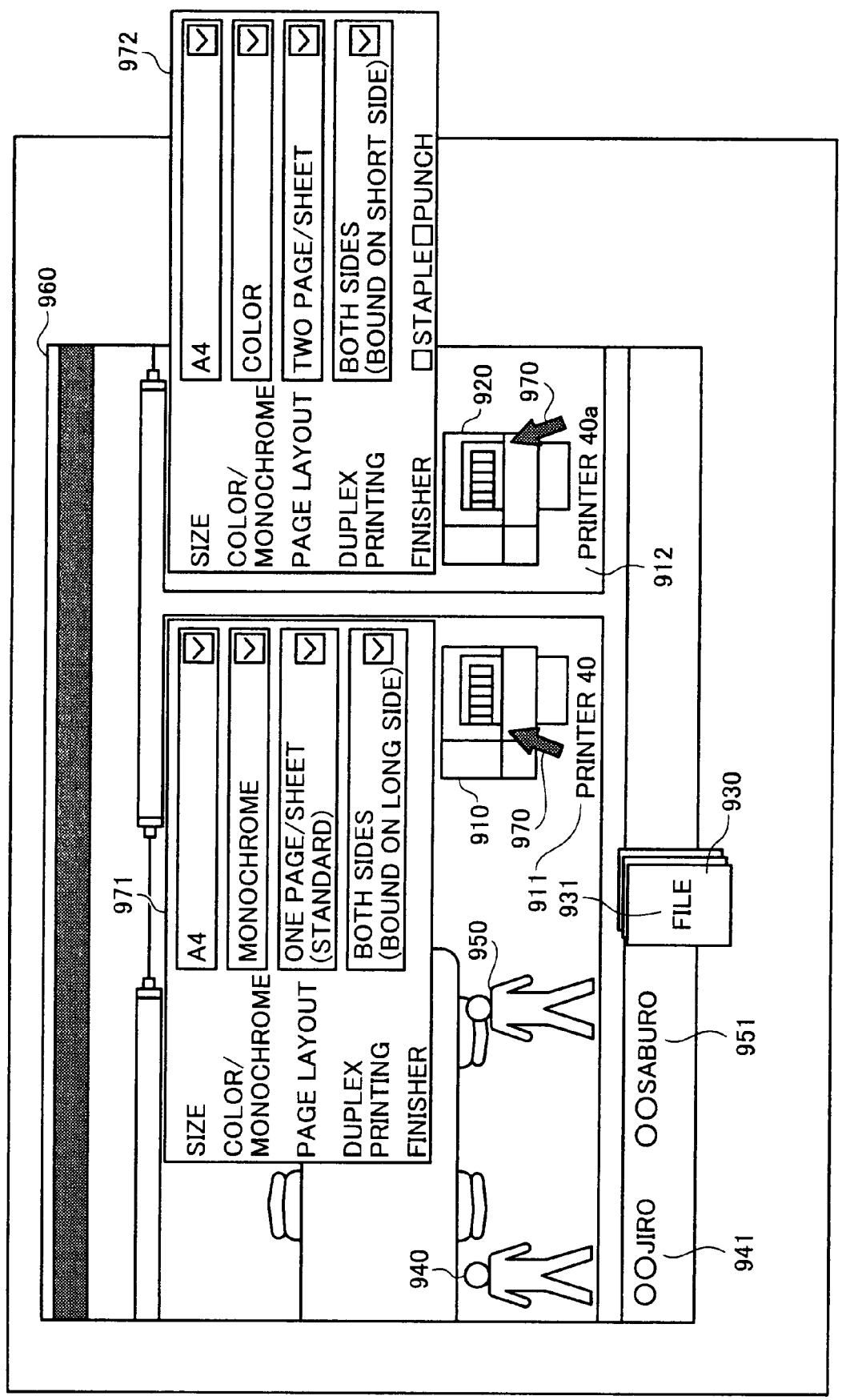
FIG. 8B is an example of a layout image in which ability information of printers is displayed.

FIG. 8B is an example of a layout image in which ability information of printers is displayed. As shown in FIG. 8B, when the pointer 970 of the mouse is pointed on the icon 910 of the printer 40, the ability information of the printer 40 is displayed to be superimposed on the layout image 960. When the pointer 970 of the mouse is pointed on the icon 920 of the printer 40a, the ability information of the printer 40a is displayed to be superimposed on the layout image 960.

The user 1b Saburo attempts to print a file stored in the PC 10 in the printer 40 set near the user 1b.

The input receiving unit 14 automatically reads the name of the user 1b from a password of the PC and receives the name from the input device 12. The storage unit 16 has a user-information management table same as that shown in FIG. 7. In the user-information management table, tag ID carried by each user, destination to which notification is to be sent, telephone number of the user, user name, name of an icon indicating the user, address of a PC operated by the user, and IC card carried by the user are registered in association with one another.

The retrieving unit 15 refers to this user-information management table according to the user name input and acquires an ID of the RFID 1b carried by the user 1b corresponding to the name. The transmitting/receiving unit 18 transmits identification information of the RFID 1b of the user 1b to the position management server 20.

In the position management server 20, the position-information generating unit 21 acquires position information of the RFID 1b based on the identification information of the RFID 1b received. The printer-information acquiring unit 22 selects the printer 40 in a position near the user 1b based on the position information of the RFID 1b acquired. The transmitting/receiving unit 24 returns the position information of the RFID 1b, a file name of the icon of the RFID 1b, the position information of the printer 40, a file name of the icon of the printer 40, and the map information of the third floor to the PC 10.

In the PC 10, the display control unit 13 displays a map of the third floor, where the user 1*b* is present now, on the screen of the monitor 11 based on these pieces of information received. The display control unit 13 displays, on the map, the icon 950 of the user 1*b* in a position where the RFID 1*b* is detected and displays the icon 910 of the printer 40 in a position of the printer 40 near the user 1*b* as shown in FIG. 8A.

Simultaneously with the start of the PC 10, authentication information of the user 1*b*, who is the owner of the PC 10, is transmitted to the position management server 20. The position-information generating unit 21 generates position information of the user 1*b*. The printer-information acquiring unit 22 acquires a file name of a printer icon and map information corresponding to the position information and returns the file name and the map information to the PC 10. However, it is also possible to input the name "Saburo" of the user 1*b* and transmit the name to the position management server 20, and, in the same manner, receive the position information, the file name of the printer icon, and the map information.

The user 1*b* drags and drops the icon 930 of the file stored in the PC 10 of the user 1*b* onto the printer icon 910 in the position near the user 1*b*. This printer icon is a printer icon of the printer 40. The input receiving unit 14 acquires a printer ID on which the icon 930 is dropped by the drag-and-drop input received and receives a print command.

The notification-destination setting unit 17 generates notification-destination information for notifying the PC 10 of the user 1*b* of the printing by the printer 40 on which the icon 930 is dropped. An address of the PC 10 as the transmission source of the print command is included in the notification-destination information. It is possible to further include addresses of all PCs to which the printing is notified. In this manner, the notification-destination setting unit 17 can set a notification destination to which a state of printing by the printer is notified.

The transmitting/receiving unit 18 transmits the ID of the printer 40 designated by the drop, the file designated by the drag, and the notification-destination information generated by the notification-destination setting unit 17 to an address of the printer management server 30.

The printer management server 30 has a printer-information storage unit 31, a driver selecting unit 32, a print-data generating unit 33, and a transmitting/receiving unit 34.

The transmitting/receiving unit 34 receives the printer ID information, the file, and the notification-destination information transmitted from the PC 10.

The printer-information storage unit 31 stores therein information such as a printer driver of each printer connected via the network 3 in association with printer ID.

The driver selecting unit 32 selects a printer driver from the printer-information storage unit 31 based on the printer ID received by the transmitting/receiving unit 34. Here, the driver selecting unit 32 selects a driver corresponding to the printer 40 on which the icon 930 is dropped on the PC 10. However, the driver selecting unit 32 can select a suitable driver by discriminating an extension and a property of the file corresponding to the icon 930.

The print-data generating unit 33 converts, using the driver selected by the driver selecting unit 32, the file corresponding to the icon 930 into print data to be printed in the printer 40 designated.

The transmitting/receiving unit 34 transmits the print command received, the print data converted, and the notification-destination information to an address of the printer 40.

The printer 40 includes an output unit 41, a notification generating unit 42, and a transmitting/receiving unit 43. The transmitting/receiving unit 43 receives the print command, the print data, and the notification-destination information transmitted from the printer management server 30.

The output unit 41 prints the print data on a recording sheet or the like according to the print command received. The notification generating unit 42 generates a notification for notifying the PC 10 of the execution of printing. The transmitting/receiving unit 43 transmits the notification according to the notification-destination information received.

An ID of the user 1*b* (or the address of the PC 10) is designated as the notification designation. The notification can include status information such as print wait, print end, and printing. In this explanation, print finished is notified. The notification generating unit 42 generates a notification when the output unit 41 has finished printing.

The notification to the PC 10 indicates that output of a file from the printer 40 has been completed and a receiver is the user 1*b*. The transmitting/receiving unit 43 transmits the print-finish notification to the PC 10.

In this embodiment, the present invention is applied to the printer as an image forming apparatus. However, the image forming apparatus is not limited to the printer. It is also possible to apply the present invention to a multifunction product and the like including a printing function.

FIGS. 9A and 9B collectively show a flowchart of a printing process according to the first embodiment. The sensor 2 detects RFIDs carried by users and transmits a detection signal to the position management server 20.

In the position management server 20, the position-information generating unit 21 generates tag position information at every moment according to signals of tags transmitted from the sensors 2 to 2*b*. The printer-information acquiring unit 22 acquires a plurality of pieces of printer information and a laid-out map image of places where printers are set from the position management database 23. The printer-information acquiring unit 22 transmits tag position information, printer information, file names of icons of the printers, and the map image to the PC 10 (step S101).

The PC 10 receives position information of the users corresponding to the RFIDs detected, position information of a plurality of printers, the map image, and the like and causes the monitor 11 to display user icons correspondingly to present positions of the users and the map image indicating the layout of the printer icons on the screen of the monitor 11 (step S102). Since the PC 10 is operated by the user 1*b*, first, the position management server 20 transmits image information and the like based on a detected position of the RFID 1*b* carried by the user 1*b*.

The input receiving unit 14 receives information on destination of a notification issued on completion of printing (step S103). When the user 1*b* inputs a name, an ID, an email address, and the like of the user (a user who instructs printing) as the notification destination from the input device 12, the input receiving unit 14 receives such an input. The name, the ID, the email address, and the like can be automatically input according to a password at the time the PC 10 is started. Information such as the name, the ID, and the email address of the user (the user who instructs printing) as the notification destination can be automatically acquired from login information or the like instead of causing the user to input the information. The notification destination is acquired to inform the user of the completion of printing (Yes at step S103). The retrieving unit 15 acquires ID information of the RFID 1b carried by the user 1b with reference to the user-information management table in the storage unit 16 and transmits the ID information to the position management server 20 (step S104).

The position management server 20 specifies position information of the RFID 1b and the printer 40 in a position near the RFID 1b based on the ID of the RFID 1b received. The position management server 20 transmits the position information and a file name of an icon of the user 1b, position information and a file name of an icon of the printer 40, and map information Map3 to the PC 10 (step S105).

The PC 10 displays, based on these pieces of information received, the icon of the user 1b and the icon of the printer 40 near the user 1b on the screen of the monitor 11 to be arranged on the map information Map3 as shown in FIG. 8 (step S106).

The user drags and drops the file icon 930 onto the icon 910 of the printer 40 to cause the printer 40 to print a file. The input receiving unit 14 detects whether the drag and drop operation is provided (step S107). When the drag and drop operation is provided (Yes at step S107), the transmitting/receiving unit 18 of the PC 10 transmits the file, the ID of the PC 10, and the ID of the printer 40 selected to the printer management server 30 (step S108). The transmitting/receiving unit 18 enters in a wait state to determine whether print-end notification to be displayed on the screen of the monitor 11 is received (step S109).

The printer management server 30 receives the ID information of the printer 40 transmitted from the PC 10. The driver selecting unit 32 selects a driver corresponding to the printer 40 out of the drivers stored in the printer-information storage unit 31 (step S110). The print-data generating unit 33 generates print data from the file using the driver (step S111) and transmits the print data to the printer 40 together with the ID information of the PC 10 at the notification destination (step S112).

In the printer 40, the output unit 41 prints out the print data received (step S113). The notification generating unit 42 determines whether printing has been completed (step S114). When printing has been completed (Yes at step S114), the notification generating unit 42 generates a notification indicating that printing has been completed. The transmitting/receiving unit 43 transmits the notification to the PC 10 (step S115).

In the PC 10, the transmitting/receiving unit 18 judges whether the notification transmitted from the printer 40 has been received (step S109). Upon receiving the notification (Yes at step S109), the display control unit 13 displays the notification that the printing has been completed on the screen of the monitor 11 (step S116).

As described above, with the printing system according to the first embodiment, a user intuitively grasps a present position of the user and positions of printers on a monitor of a PC, selects a suitable printer, for example, a printer near the user by dragging and dropping an icon, and causes the printer to print a file. After the printing is finished, the PC displays finish notification on the monitor. Consequently, the user selects, without the complicated printer setting in the PC, a printer with simple operation and causes the printer to print out the file. After the printing is finished, the PC notifies the user of the print finish. This makes it possible to reduce complexity of data management after the output with simple operation and perform highly convenient printing.

In the above explanation, the apparatus that executes printing is the PC. However, actually, it is possible to apply the present invention to any apparatus as long as the apparatus instructs print processing.

For example, a printer and a notification destination are displayed on a display screen of a cellular phone and an email attached with a file is transmitted to the printer management server 30. This makes it possible to perform printing same as that explained in the first embodiment.

Moreover, a printer and a notification destination are displayed on a display screen of a personal digital assistant (PDA) and a file is transmitted to the printer management server 30 via a wireless LAN. This makes it possible to perform printing same as that explained in the first embodiment.

In the above explanation, as the notification, a notification for notifying a user of the completion of printing is transmitted after printing is completed. Besides, information for indicating a state of a printer, for example, status information indicating a lack of paper, ink shortage, a type of a sheet set, and the like can be notified during printing, offline, and in other cases.

In the first embodiment, position identification is performed by using a radio tag. However, instead of the radio tag, for example, a wired LAN can be applied. In the wired LAN, locations of desk-top PCs are registered in the same manner as image forming apparatuses and communication is performed with IP addresses or MAC addresses as unique IDs. Because a user knows a position of a PC that the user is using, the user can identify a printer in a position near the PC.

A printing system according to a second embodiment of the present invention is different from the printing system according to the first embodiment in that the display control unit 13 changes a scale and a display position of a laid-out map image on the monitor 11 based on position information of users and position information of printers. Consequently, screen display easy to see for a user is obtained. A functional block diagram of the printing system according to the second embodiment is the same as that according to the first embodiment. Thus, the functional block diagram is omitted.

Figure 10B:
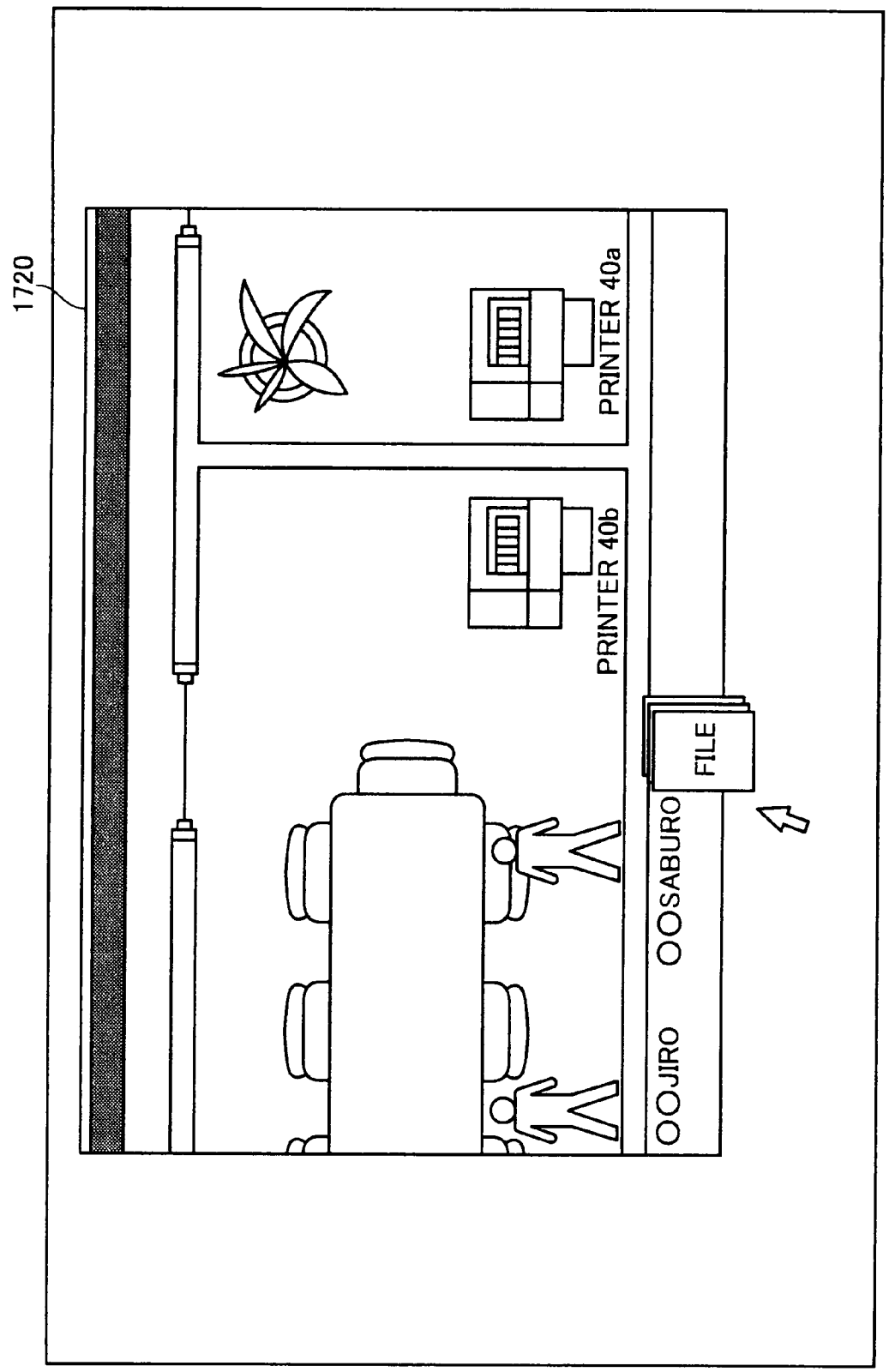

FIGS. 10A and 10B collectively show a schematic for explaining a laid-out map image displayed on a monitor by the printing system according to the second embodiment. A laid-out map image 1710 depicts a layout received first. A laid-out map image 1720 is displayed in enlargement.

The display control unit 13 calculates distances among users and printers 40a to 40f on the screen based on the position information of the users and the position information of the printers 40a to 40f received. When the distances calculated are equal to or smaller than a predetermined distance on the screen, the display control unit 13 enlarges the map image 1710 and displays the map image 1710 as the map image 1720 on the monitor 11. Consequently, screen display easier to see for the user is obtained.

On the other hand, the display control unit 13 calculates distances among the users and the printers 40a to 40f on the screen based on the position information of the users and the position information of the printers 40a to 40f received. When the distances calculated are equal to or larger than the predetermined distance on the screen, the display control unit 13 reduces an image to be displayed and displays the image on the monitor 11. Consequently, screen display with which the user can overlook the entire image is obtained. For example, when the map image 1720 is displayed partially, the display control unit 13 displays the map image with an increased scale like the map image 1710.

When midpoint coordinates of the position information of the users and the position information of the printers 40a to 40f are distant from the center of the monitor 11 by a predetermined distance or more, the display control unit 13 moves the midpoint coordinates to be close to the center of the screen. Consequently, an object that the user desires to see is arranged near the center and screen display easier to see for the user is obtained.

When the printers 40*a* to 40*f* displayed on the monitor 11 are too close to one another and displayed as if the printers 40*a* to 40*f* overlap, the display control unit 13 compares pieces of position information of the printers 40*a* to 40*f*. When it is judged that distances among the printers 40*a* to 40*f* are equal to or smaller than a predetermined value, the display control unit 13 sets position information to display positions of printer icons apart from one another. This makes it possible to display the icons apart from one another to prevent overlap.

Thus, in the printing system according to the second embodiment, when the layout of users and printers is hard to see on the monitor of the PC, a display form is changed to a display form easier to see for the user.

In the printing systems according to the first and the second embodiments, when the user issues a print command from the PC 10, printing is performed immediately. This is print processing of a so-called PUSH type. In a printing system according to a third embodiment of the present invention, before a user receives a print output from a printer, the user inputs authentication information to the printer. A printer management server verifies the authentication information, and, only when the authentication is successful, the print output from a reserved printer is performed. This is print processing of a so-called PULL type.

Consequently, when the user performs printing, the user who has issued a print command through the PC is authenticated with authentication information of the user, and, only when the authentication is successful, printing is performed. Thus, users other than the user who issues the print command cannot perform printing. This makes it possible to improve security of information and reduce complexity of data management after printing.

Figure 11:
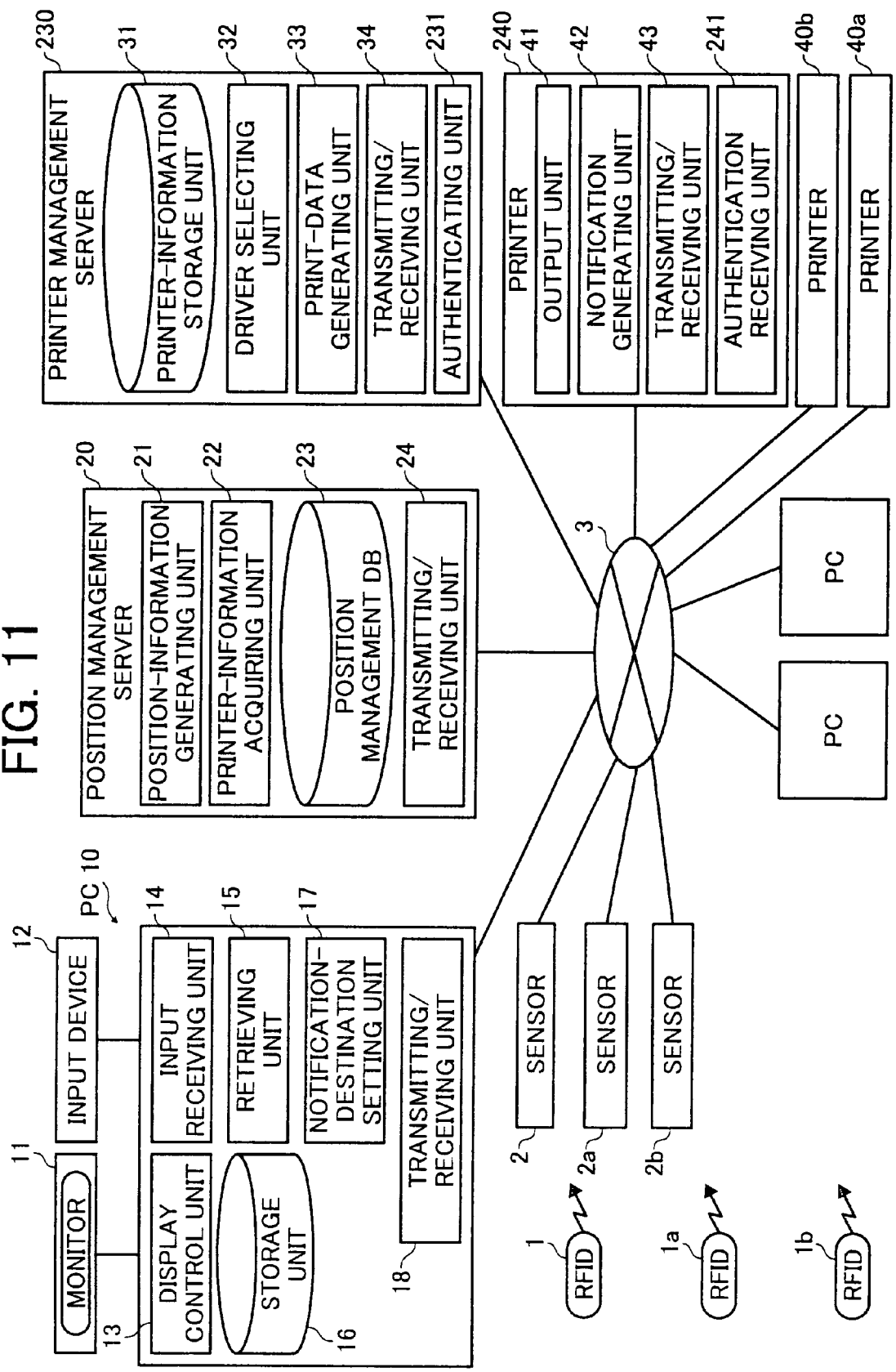
FIG. 11 is a functional block diagram of a printing system according to a third embodiment of the present invention.

FIG. 11 is a functional block diagram of the printing system according to the third embodiment. A printer management server 230 includes an authenticating unit 231 in addition to the units of the printer management server 30 according to the first embodiment. A printer 240 includes an authentication receiving unit 241 in addition to the units of the printer 40 according to the first embodiment. Structures of the PC 10 and the position management server 20 are the same as those according to the first embodiment.

The authentication receiving unit 241 of the printer 240 reads authentication information of an IC card carried by a user and transmits the authentication information to the printer management server 230. The printer management server 230 stores therein authentication information of the user in a storage unit or the like in advance. The authenticating unit 231 receives the authentication information of the user from the printer 240 and compares the authentication information received with the authentication information stored in the storage unit or the like. When the authentication is successful, the authenticating unit 231 generates print data from a file received. The printer management server 230 can use notification-destination information, which is received from the PC 10, as authentication information instead of storing the authentication information of the user in the storage unit or the like.

The other components of the printer 240 and the printer management server 230 are the same as those according to the first embodiment.

Figure 12B:
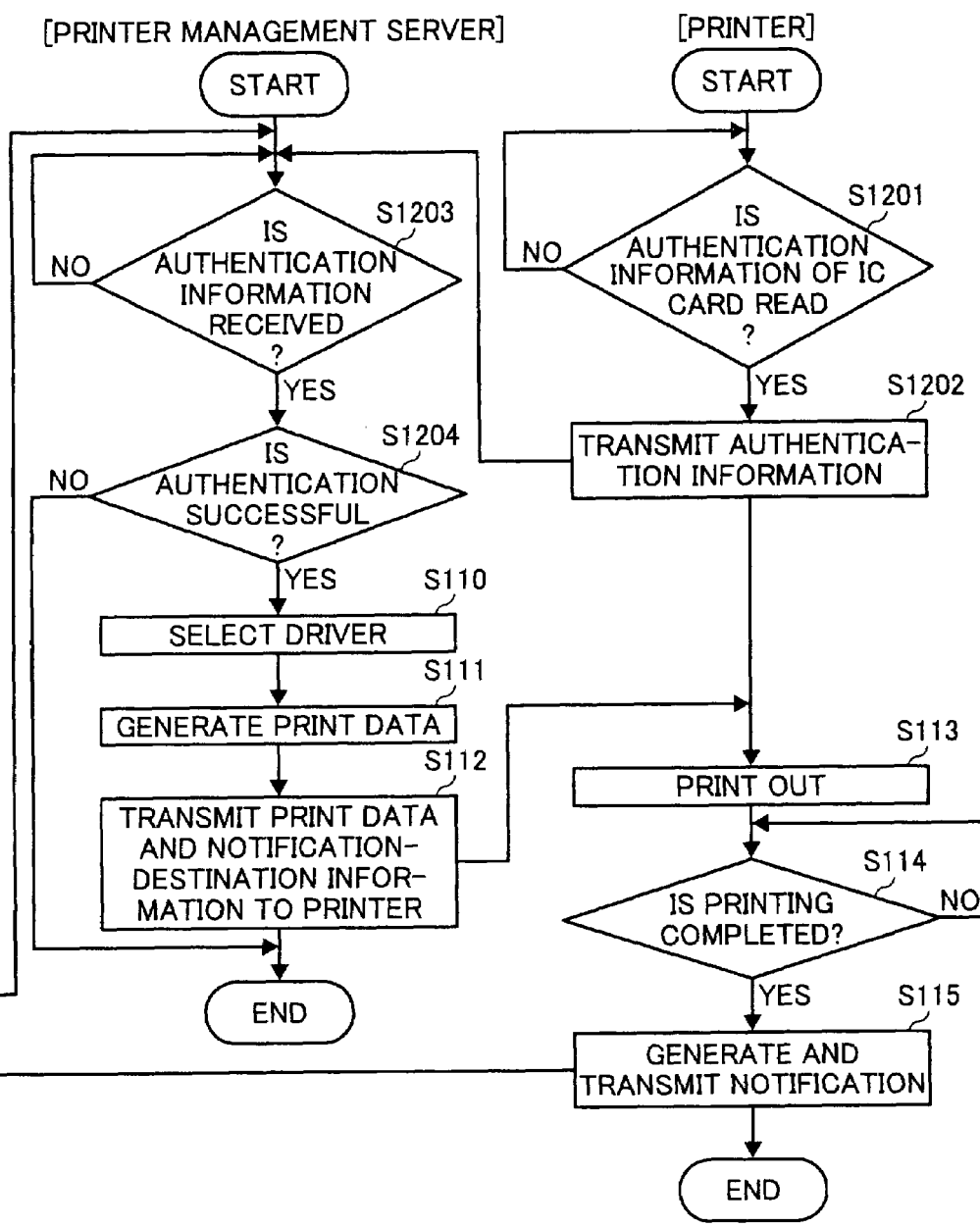

FIGS. 12A and 12B collectively show a flowchart of a printing process according to the third embodiment. Steps different from those of the printing process according to the first embodiment are mainly explained.

Processing on the PC 10 side (steps S102 to S116) and processing on the position management server 20 (steps S102 and S105) are performed in the same manner as the processing according to the first embodiment.

The authentication receiving unit 241 of the printer 240 is in a state of detection of authentication information of an IC card (step S1201). When the authentication information is read (Yes at step S1201), the transmitting/receiving unit 43 transmits the authentication information read to the printer management server 230 (step S1202).

The printer management server 230 receives a file, printer information, and notification-destination information from the PC 10 (step S108). The authenticating unit 231 of the printer 240 is in a wait state to receive authentication information (step S1203). Upon receiving the authentication information (Yes at step S1203), the authenticating unit 231 compares authentication information of a user 1 stored in the storage unit or the like with the authentication information received (step S1204).

When the two pieces of authentication information match successfully (Yes at step S1204), the authenticating unit 231 selects a driver (step S110) and generates print data (step S111). Since the subsequent steps are the same as those according to the first embodiment, explanations of the steps are omitted.

On the other hand, when the authentication is not successful (No at step S1204), the authenticating unit 231 finishes the print processing.

As described above, in the printing system according to the third embodiment, when a user issues a print command, the user is authenticated in the printer and the printer management server using an IC card, i.e., authentication information of the user. Only when the user is authenticated successfully, printing is performed. Thus, users other than the user who issues the print command cannot perform printing. This makes it possible to improve security of information output and reduce complexity of data management after printing.

In the explanations of the first to the third embodiments, the present invention is applied to the PC 10 as an output requesting apparatus. However, the output requesting apparatus is not limited to the PC 10. It is possible to apply the present invention to any apparatus as long as the apparatus performs a predetermined output request. For example, the present invention can be applied to a multifunction product having at least one of a printer function, a scanner function, a copy function, and a facsimile function as the output requesting apparatus.

Moreover, it is possible to apply the present invention to any apparatus as an output apparatus as long as the apparatus is movable and performs predetermined output processing. For example, the present invention can be applied to a cellular phone, a household electric appliance, and a vending machine as output apparatuses.

In this case, positions of the cellular phone, the household electronic appliance, and the vending machine, and the like on a map only have to be displayed in the PC 10 to request the respective apparatuses to perform output. When the arrangement of the cellular phone, the household electronic appliance, the vending machine, and the like is changed, positions of the respective apparatuses displayed in the PC 10 only have to be displayed on the map as positions after movement. In this case, there is an advantage that it is possible to execute appropriate output processing while always accurately grasping the layout of the apparatuses.

Figure 13:
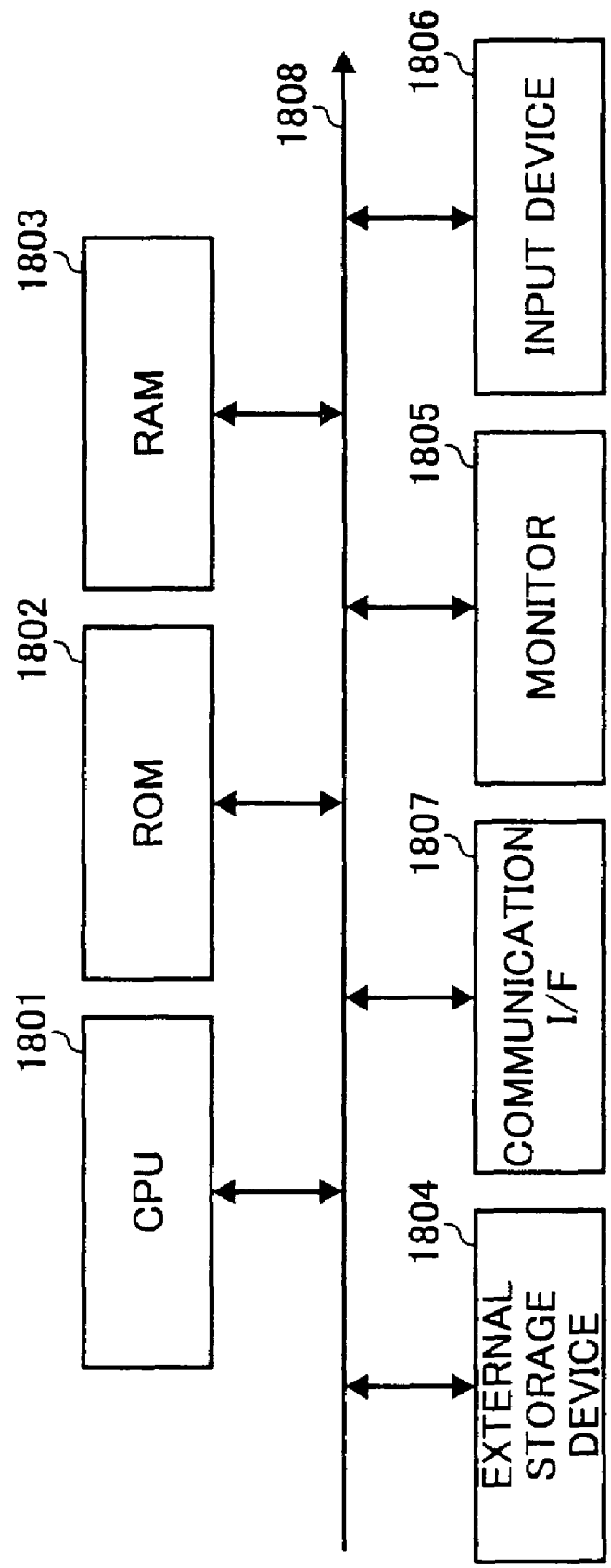
FIG. 13 is a diagram of a hardware configuration of devices of the printing systems according to the first and the second embodiments.

FIG. 13 is a diagram of a hardware configuration of the PC 10 and the printer management servers 30 and 230 of the printing systems according to the first to the third embodiments. The PC 10 and the printer management servers 30 and 230 include, as shown in FIG. 13, a control unit such as a central processing unit (CPU) 1801, storage units such as a read only memory (ROM) 1802 and a random access memory (RAM) 1803, an external storage device 1804 such as a hard disk drive (HDD) or a compact disk (CD) drive, an input device 1806 such as a keyboard or a mouse, a communication interface (I/F) 1807, which are connected by a bus 1808. The PC 10 and the printer management servers 30 and 230 have a hardware structure that uses a usual computer.

A computer program (hereinafter, "printing program") executed on the respective apparatuses according to the first to the third embodiments is stored in a computer-readable recording medium such as a compact disk-read only memory (CD-ROM), a flexible disk (FD), a compact disk-recordable, or a digital versatile disk (DVD) in an installable format or an executable format and provided.

The printing program can be stored in a computer connected to a network such as the Internet and downloaded through the network. The printing program can be provided or distributed through a network such as the Internet. The printing program can also be stored in a ROM or the like in advance.

The printing program includes modules that implement the units described above (the display control unit, the input receiving unit, the retrieving unit, the storage unit, the notification-destination setting unit, the transmitting/receiving unit, the position-information generating unit, the printer-information acquiring unit, the driver selecting unit, the print-information generating unit, the output unit, the notification generating unit, etc.). As actual hardware, when a CPU (a processor) loads the printing program from the storage medium into a main storage device and executes the printing program, the display control unit, the input receiving unit, the retrieving unit, the storage unit, the notification-destination setting unit, the transmitting/receiving unit, the position-information generating unit, the printer-information acquiring unit, the driver selecting unit, the print-information generating unit, the output unit, the notification generating unit, and the like are implemented on the main storage device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output requesting apparatus that is connected via a network to an output apparatus and a position-management server chat manages user-position information indicating a detected position of a user and apparatus-position information indicating a detected position of the output apparatus, the output requesting apparatus comprising:

a storage unit that stores therein data;

a receiving unit that receives, from the position-management server, the user-position information, the apparatus-position information, and a map image that indicates an area where the output apparatus is installable;

a display control unit that arranges in said map image a user symbol corresponding to the user and indicating the detected position of the user, an apparatus symbol corresponding to the output apparatus and indicating the detected position of the output apparatus, and a data symbol indicating the data in the map image, based on the user-position information and the apparatus-position information, and displays the map image that indicates a physical positional relationship between the output apparatus and the user on a display unit;

an input unit that receives selection input to select the apparatus symbol and the data symbol in the map image; and a transmitting unit that transmits, to the output apparatus corresponding to the apparatus symbol, a first command to request the output apparatus to output the data corresponding to the data symbol, and a second command to request the output apparatus to notify the output requesting apparatus of output state, wherein said first command is a print command issued based on the selection input of the apparatus symbol in the map image that includes the user symbol and the apparatus symbol and indicates physical positional relationship between the output apparatus and the user.

2. The output requesting apparatus according to claim 1, wherein the input unit receives the input through operation of dragging and dropping the data symbol onto the apparatus symbol.

3. The output requesting apparatus according to claim 1, wherein the display control unit displays the user symbol and the apparatus symbol as icons.

4. The output requesting apparatus according to claim 1, wherein the display control unit displays the map image in an enlarged size or a reduced site based on the user-position information and the apparatus-position information.

5. The output requesting apparatus according to claim 1, wherein
the receiving unit further receives ability information indicating output function of the output apparatus from the position-management server, and
the display control unit displays, when the apparatus symbol is selected, the ability information of the output apparatus corresponding to the apparatus symbol on the map image.

6. The output requesting apparatus according to claim 1, wherein
the output requesting apparatus is connected via the network to an output-management server that manages output of the output apparatus; and the transmitting unit transmits the first command and the second command to the output-management server.

7. A position-management server that is connected via a network to an output apparatus and an output requesting apparatus, comprising:

a position acquiring unit that acquires user-position information indicating a detected position of a user;

a storage unit that stores therein apparatus-position information indicating a position of the output apparatus, and a map image that indicates an area where the output apparatus is installable that indicates a physical positional relationship between the output apparatus and the user;

a transmitting unit that transmits the user-position information, the apparatus-position information, and the map image to the output requesting apparatus;

a printer information management table configured to register for each of a plurality of output devices, a device ID corresponding to the output device, and device position information corresponding to a location of the output device; and a position-information generating unit that acquires the user-position information indicating the detected position of the destination user, and selects from the printer information management table, a destination output apparatus that has a location close to the detected position of said destination user.

8. The position-management server according to claim 7, wherein the storage unit further scores therein ability information indicating output function of the output apparatus, and the transmitting unit further transmits the ability information to the output requesting apparatus.

9. The position-management server according to claim 7, wherein the position acquiring unit acquires the user-position information by detecting a position of radio tag carried by the user.

10. A computer program product used in a system in which an output requesting apparatus is connected via a network to an output apparatus and a position-management server that manages user-position information indicating a detected position of a user and apparatus-position information indicating a detected position of the output apparatus, the computer program product comprising a computer usable medium having computer readable program codes embodied in the medium that, when executed, cause a computer to execute:

receiving information, from the position-management server, including the user-position information, the apparatus-position information, and a map image that indicates an area where the output apparatus is installable;

arranging in said man image a user symbol corresponding to the user and indicating the detected position of the user, an apparatus symbol corresponding to the output apparatus and indicating the detected position of the output apparatus, and a data symbol indicating data in the map image, based on the user-position information and the apparatus-position information;

displaying the map image that indicates a physical positional relationship between the output apparatus and the user;

receiving selection input to select the apparatus symbol and the data symbol in the map image; and transmitting, to the output apparatus corresponding to the apparatus symbol, a first command to output the data corresponding to the data symbol, and a second command to notify the output requesting apparatus of output state, based on said selection input, wherein the first command is a print command issued based on the selection input of the apparatus symbol in the map image that includes the user symbol and the apparatus symbol and indicates the physical positional relationship between the output apparatus and the user.

11. The output requesting apparatus according to claim 10, wherein the receiving input includes receiving the input through operation of dragging and dropping the data symbol onto the apparatus symbol.

12. The output requesting apparatus according to claim 10, wherein the displaying includes displaying the user symbol and the apparatus symbol as icons.

13. The output requesting apparatus according to claim 10, wherein the displaying includes displaying the map image in an enlarged size or a reduced size based on the user-position information and the apparatus-position information.

14. The output requesting apparatus according to claim 10, wherein the receiving information includes receiving ability information indicating output function of the output apparatus from the position-management server, and the displaying includes displaying, when the apparatus symbol is selected, the ability information of the output apparatus corresponding to the apparatus symbol on the map image.

15. The position-management server of claim 7, wherein said position-information generating unit selects a destination map image associated with co-ordinate position information corresponding to the location of said destination output apparatus and the detected position of said destination user, and said transmitting unit transmits the destination map image to the output requesting apparatus.

16. The output requesting apparatus according to claim 5, wherein the ability information of the output apparatus includes at least one of:

information indicating available print sizes on the output apparatus;

information indicating whether the output apparatus is able to perform color printing or is able to perform only monochrome printing;

information indicating page layouts not available on the output apparatus;

information indicating types of duplex printing available on the output apparatus; and information about availability of a finisher on the output apparatus.

* * * * *